(12) United States Patent
Saleki et al.

(10) Patent No.: US 8,251,672 B2
(45) Date of Patent: Aug. 28, 2012

(54) ELECTROKINETIC PUMP WITH FIXED STROKE VOLUME

(75) Inventors: Mansour A. Saleki, San Jose, CA (US); Antonio Reis, Modesto, CA (US)

(73) Assignee: Eksigent Technologies, LLC, Dublin, CA (US)

(*) Notice: Subject to any disclaimer, the term of this patent is extended or adjusted under 35 U.S.C. 154(b) by 606 days.

(21) Appl. No.: 12/327,568

(22) Filed: Dec. 3, 2008

(65) Prior Publication Data

US 2009/0148308 A1 Jun. 11, 2009

Related U.S. Application Data

(60) Provisional application No. 61/007,357, filed on Dec. 11, 2007.

(51) Int. Cl.
*F04B 43/12* (2006.01)
(52) U.S. Cl. ........... 417/53; 204/601; 204/602; 604/152
(58) Field of Classification Search ................ 417/53; 204/275.1, 601, 602
See application file for complete search history.

(56) References Cited

U.S. PATENT DOCUMENTS

| | | |
|---|---|---|
| 1,063,204 A | 6/1913 | Kraft |
| 2,615,940 A | 10/1952 | Williams |
| 2,644,900 A | 7/1953 | Hardway, Jr. |
| 2,644,902 A | 7/1953 | Hardway, Jr. |
| 2,661,430 A | 12/1953 | Hardway, Jr. |
| 2,841,324 A | 7/1958 | Santeler |
| 2,995,714 A | 8/1961 | Hannah |
| 3,143,691 A | 8/1964 | Hurd |
| 3,209,255 A | 9/1965 | Estes et al. |
| 3,298,789 A | 1/1967 | Mast |
| 3,427,978 A | 2/1969 | Hanneman et al. |
| 3,544,237 A | 12/1970 | Walz |
| 3,587,227 A | 6/1971 | Weingarten et al. |
| 3,630,957 A | 12/1971 | Rey et al. |
| 3,682,239 A | 8/1972 | Abu-Romia |
| 3,714,528 A | 1/1973 | Vail |
| 3,739,573 A | 6/1973 | Giner |
| 3,923,426 A | 12/1975 | Theeuwes |
| 3,952,577 A | 4/1976 | Hayes et al. |
| 4,043,895 A | 8/1977 | Gritzner |
| 4,140,122 A | 2/1979 | Kuhl et al. |
| 4,240,889 A | 12/1980 | Yoda et al. |

(Continued)

FOREIGN PATENT DOCUMENTS

CN        2286429 Y        7/1998

(Continued)

OTHER PUBLICATIONS

Adamson et al., Physical Chemistry of Surfaces, pp. 185-187 (Wiley, NY 1997).

(Continued)

*Primary Examiner* — Nimeshkumar Patel
*Assistant Examiner* — Mary Ellen Bowman
(74) *Attorney, Agent, or Firm* — Shay Glenn LLP (57) ABSTRACT

An electrokinetic pump and fluid delivery system is provided that may include any of a number of features. One feature of the fluid delivery system is that it can deliver a fixed volume of fluid with each stroke of the electrokinetic pump. Another feature of the fluid delivery system is that it can accurately deliver fluid at a target flow rate over time. Methods associated with use of the electrokinetic pump and fluid delivery system are also covered.

35 Claims, 6 Drawing Sheets

U.S. PATENT DOCUMENTS

| | | |
|---|---|---|
| 4,383,265 A | 5/1983 | Kohashi |
| 4,396,925 A | 8/1983 | Kohashi |
| 4,402,817 A | 9/1983 | Maget |
| 4,552,277 A | 11/1985 | Richardson et al. |
| 4,639,244 A | 1/1987 | Rizk et al. |
| 4,687,424 A | 8/1987 | Heimes |
| 4,704,324 A | 11/1987 | Davis et al. |
| 4,789,801 A | 12/1988 | Lee |
| 4,886,514 A | 12/1989 | Maget |
| 4,908,112 A | 3/1990 | Pace |
| 4,921,041 A | 5/1990 | Akachi |
| 4,999,069 A | 3/1991 | Brackett et al. |
| 5,004,543 A | 4/1991 | Pluskal et al. |
| 5,037,457 A | 8/1991 | Goldsmith et al. |
| 5,087,338 A | 2/1992 | Perry et al. |
| 5,116,471 A | 5/1992 | Chien et al. |
| 5,126,022 A | 6/1992 | Soane et al. |
| 5,137,633 A | 8/1992 | Wang |
| 5,219,020 A | 6/1993 | Akachi |
| 5,260,855 A | 11/1993 | Kaschmitter et al. |
| 5,296,115 A | 3/1994 | Rocklin et al. |
| 5,351,164 A | 9/1994 | Grigortchak et al. |
| 5,418,079 A | 5/1995 | Diethelm |
| 5,531,575 A | 7/1996 | Lin |
| 5,534,328 A | 7/1996 | Ashmead et al. |
| 5,573,651 A | 11/1996 | Dasgupta et al. |
| 5,581,438 A | 12/1996 | Halliop |
| 5,628,890 A | 5/1997 | Carter et al. |
| 5,632,876 A | 5/1997 | Zanzucchi et al. |
| 5,658,355 A | 8/1997 | Cottevieille et al. |
| 5,683,443 A | 11/1997 | Munshi et al. |
| 5,766,435 A | 6/1998 | Liao et al. |
| 5,858,193 A | 1/1999 | Zanzucchi et al. |
| 5,862,035 A | 1/1999 | Farahmandi et al. |
| 5,888,390 A | 3/1999 | Craig |
| 5,891,097 A | 4/1999 | Saito et al. |
| 5,942,093 A | 8/1999 | Rakestraw et al. |
| 5,942,443 A | 8/1999 | Parce et al. |
| 5,958,203 A | 9/1999 | Parce et al. |
| RE36,350 E | 10/1999 | Swedberg et al. |
| 5,961,800 A | 10/1999 | McBride et al. |
| 5,964,997 A | 10/1999 | McBride |
| 5,989,402 A | 11/1999 | Chow et al. |
| 5,997,708 A | 12/1999 | Craig |
| 6,007,690 A | 12/1999 | Nelson et al. |
| 6,012,902 A | 1/2000 | Parce |
| 6,013,164 A | 1/2000 | Paul et al. |
| 6,019,882 A | 2/2000 | Paul et al. |
| 6,045,933 A | 4/2000 | Okamoto |
| 6,054,034 A | 4/2000 | Soane et al. |
| 6,068,752 A | 5/2000 | Dubrow et al. |
| 6,068,767 A | 5/2000 | Garguilo et al. |
| 6,074,725 A | 6/2000 | Kennedy |
| 6,086,243 A | 7/2000 | Paul et al. |
| 6,090,251 A | 7/2000 | Sundberg et al. |
| 6,100,107 A | 8/2000 | Lei et al. |
| 6,106,685 A | 8/2000 | McBride et al. |
| 6,113,766 A | 9/2000 | Steiner et al. |
| 6,126,723 A | 10/2000 | Drost et al. |
| 6,129,973 A | 10/2000 | Martin et al. |
| 6,137,501 A | 10/2000 | Wen et al. |
| 6,150,089 A | 11/2000 | Schwartz |
| 6,156,273 A | 12/2000 | Regnier et al. |
| 6,159,353 A | 12/2000 | West et al. |
| 6,167,910 B1 | 1/2001 | Chow |
| 6,176,962 B1 | 1/2001 | Soane et al. |
| 6,210,986 B1 | 4/2001 | Arnold et al. |
| 6,224,728 B1 | 5/2001 | Oborny et al. |
| 6,238,538 B1 | 5/2001 | Parce et al. |
| 6,255,551 B1 | 7/2001 | Shapiro et al. |
| 6,257,844 B1 | 7/2001 | Stern |
| 6,267,858 B1 | 7/2001 | Parce et al. |
| 6,274,089 B1 | 8/2001 | Chow et al. |
| 6,277,257 B1 | 8/2001 | Paul et al. |
| 6,287,438 B1 | 9/2001 | Knoll |
| 6,287,440 B1 | 9/2001 | Arnold et al. |
| 6,290,909 B1 | 9/2001 | Paul et al. |
| 6,319,476 B1 | 11/2001 | Victor, Jr. et al. |
| 6,320,160 B1 | 11/2001 | Eidsnes et al. |
| 6,344,120 B1 | 2/2002 | Haswell et al. |
| 6,379,402 B1 | 4/2002 | Suhara et al. |
| 6,406,605 B1 | 6/2002 | Moles |
| 6,409,698 B1 | 6/2002 | Robinson et al. |
| 6,418,966 B2 | 7/2002 | Loo |
| 6,418,968 B1 | 7/2002 | Pezzuto et al. |
| 6,444,150 B1 | 9/2002 | Arnold |
| 6,460,420 B1 | 10/2002 | Paul et al. |
| 6,472,443 B1 | 10/2002 | Shepodd |
| 6,477,410 B1 | 11/2002 | Nelson et al. |
| 6,495,015 B1 | 12/2002 | Schoeniger et al. |
| 6,529,377 B1 | 3/2003 | Nelson et al. |
| 6,561,208 B1 | 5/2003 | O'Connor et al. |
| 6,605,472 B1 | 8/2003 | Skinner et al. |
| 6,619,925 B2 | 9/2003 | Ohkawa |
| 6,620,625 B2 | 9/2003 | Wolk et al. |
| 6,689,373 B2 | 2/2004 | Johnson et al. |
| 6,709,559 B2 | 3/2004 | Sundberg et al. |
| 6,719,535 B2 | 4/2004 | Rakestraw et al. |
| 6,729,352 B2 | 5/2004 | O'Connor et al. |
| 6,733,244 B1 | 5/2004 | Fritsch et al. |
| 6,766,817 B2 | 7/2004 | da Silva |
| 6,770,182 B1 | 8/2004 | Griffiths et al. |
| 6,770,183 B1 | 8/2004 | Hencken et al. |
| 6,814,859 B2 | 11/2004 | Koehler et al. |
| 6,832,787 B1 | 12/2004 | Renzi |
| 6,878,473 B2 | 4/2005 | Yamauchi et al. |
| 6,918,404 B2 | 7/2005 | Dias da Silva |
| 6,942,018 B2 | 9/2005 | Goodson et al. |
| 6,952,962 B2 | 10/2005 | Hasselbrink et al. |
| 6,994,151 B2 | 2/2006 | Zhou et al. |
| 7,050,660 B2 | 5/2006 | Cyr et al. |
| 7,094,464 B2 | 8/2006 | Mao et al. |
| 7,101,947 B2 | 9/2006 | Schlenoff et al. |
| 7,147,955 B2 | 12/2006 | Adams |
| 7,217,351 B2 | 5/2007 | Krumme |
| 7,235,164 B2 | 6/2007 | Anex et al. |
| 7,258,777 B2 | 8/2007 | Paul et al. |
| 7,267,753 B2 | 9/2007 | Anex et al. |
| 7,364,647 B2 | 4/2008 | Paul et al. |
| 7,399,398 B2 | 7/2008 | Rakestraw et al. |
| 7,429,317 B2 | 9/2008 | Paul |
| 7,517,440 B2 | 4/2009 | Anex et al. |
| 7,521,140 B2 | 4/2009 | Arnold et al. |
| 7,559,356 B2 | 7/2009 | Paul et al. |
| 7,575,722 B2 | 8/2009 | Arnold |
| 2001/0008212 A1 | 7/2001 | Shepodd et al. |
| 2001/0052460 A1 | 12/2001 | Chien et al. |
| 2002/0043805 A1 | 4/2002 | Charles et al. |
| 2002/0048425 A1 | 4/2002 | McBride et al. |
| 2002/0056639 A1 | 5/2002 | Lackritz et al. |
| 2002/0066639 A1 | 6/2002 | Taylor et al. |
| 2002/0070116 A1 | 6/2002 | Ohkawa |
| 2002/0076598 A1 | 6/2002 | Bostaph et al. |
| 2002/0089807 A1 | 7/2002 | Bluvstein et al. |
| 2002/0125134 A1 | 9/2002 | Santiago et al. |
| 2002/0166592 A1 | 11/2002 | Liu et al. |
| 2002/0187074 A1 | 12/2002 | O'Connor et al. |
| 2002/0187197 A1 | 12/2002 | Caruso et al. |
| 2002/0187557 A1 | 12/2002 | Hobbs et al. |
| 2002/0189947 A1 | 12/2002 | Paul et al. |
| 2002/0195344 A1 | 12/2002 | Neyer et al. |
| 2003/0044669 A1 | 3/2003 | Hidaka et al. |
| 2003/0052007 A1 | 3/2003 | Paul et al. |
| 2003/0061687 A1 | 4/2003 | Hansen et al. |
| 2003/0116738 A1 | 6/2003 | O'Connor et al. |
| 2003/0138678 A1 | 7/2003 | Preidel |
| 2003/0173781 A1 | 9/2003 | Dodgson et al. |
| 2003/0190514 A1 | 10/2003 | Okada et al. |
| 2003/0198130 A1 | 10/2003 | Karp et al. |
| 2003/0198576 A1 | 10/2003 | Coyne et al. |
| 2003/0206806 A1 | 11/2003 | Paul et al. |
| 2003/0215686 A1 | 11/2003 | DeFilippis et al. |
| 2003/0226754 A1 | 12/2003 | Le Febre |
| 2003/0232203 A1 | 12/2003 | Mutlu et al. |
| 2004/0011648 A1 | 1/2004 | Paul et al. |
| 2004/0070116 A1 | 4/2004 | Kaiser et al. |
| 2004/0087033 A1 | 5/2004 | Schembri |

| | | | |
|---|---|---|---|
| 2004/0101421 | A1 | 5/2004 | Kenny et al. |
| 2004/0106192 | A1 | 6/2004 | Jeon et al. |
| 2004/0115731 | A1 | 6/2004 | Hansen et al. |
| 2004/0118189 | A1 | 6/2004 | Karp et al. |
| 2004/0129568 | A1 | 7/2004 | Seul et al. |
| 2004/0163957 | A1 | 8/2004 | Neyer et al. |
| 2004/0238052 | A1 | 12/2004 | Karp et al. |
| 2004/0241004 | A1 | 12/2004 | Goodson et al. |
| 2004/0241006 | A1 | 12/2004 | Taboryski et al. |
| 2004/0247450 | A1 | 12/2004 | Kutchinsky et al. |
| 2004/0248167 | A1 | 12/2004 | Quake et al. |
| 2005/0161326 | A1 | 7/2005 | Morita et al. |
| 2005/0166980 | A1 | 8/2005 | Unger et al. |
| 2005/0252772 | A1 | 11/2005 | Paul et al. |
| 2007/0066939 | A1 | 3/2007 | Krulevitch et al. |
| 2007/0129792 | A1 | 6/2007 | Picart et al. |
| 2007/0144909 | A1 | 6/2007 | Anex et al. |
| 2007/0148014 | A1 | 6/2007 | Anex et al. |
| 2007/0224055 | A1 | 9/2007 | Anex et al. |
| 2008/0173545 | A1 | 7/2008 | Anex et al. |
| 2008/0179188 | A1 | 7/2008 | Nelson et al. |
| 2009/0185916 | A1 | 7/2009 | Anex et al. |
| 2011/0114492 | A1 | 5/2011 | Anex et al. |

FOREIGN PATENT DOCUMENTS

| | | |
|---|---|---|
| DE | 1817719 A1 | 7/1970 |
| EP | 0421234 A2 | 4/1991 |
| EP | 1063204 A2 | 12/2000 |
| JP | H02-229531 | 9/1990 |
| JP | 03-08759 A | 4/1991 |
| JP | U04-034468 | 3/1992 |
| JP | 07269971 A | 10/1995 |
| JP | 09270265 A | 10/1997 |
| JP | 02-265598 | 9/2002 |
| WO | WO 94/05354 A1 | 3/1994 |
| WO | WO 96/39252 A1 | 12/1996 |
| WO | WO 98/25065 A1 | 6/1998 |
| WO | WO 98/33001 A1 | 7/1998 |
| WO | WO 99/16162 A1 | 4/1999 |
| WO | WO 00/04832 A1 | 2/2000 |
| WO | WO 00/52376 A1 | 9/2000 |
| WO | WO 00/55502 A1 | 9/2000 |
| WO | WO 00/79131 A1 | 12/2000 |
| WO | WO 01/25138 A1 | 4/2001 |
| WO | WO 01/86155 A1 | 11/2001 |
| WO | WO 02/068821 A2 | 9/2002 |
| WO | WO02/070942 A1 | 9/2002 |
| WO | WO 02/086332 A1 | 10/2002 |
| WO | WO 2004/007348 A1 | 1/2004 |

OTHER PUBLICATIONS

Ananthakrishnan et al., Laminar Dispersion in capillaries; A.I. Ch.E. Journal, 11(6):1063-1072 (Nov. 1965).
Aris, R.; On the dispersion of a solute in a fluid flowing through a tube. Proceedings of the Royal Society of London; Series A, Mathematical and Physical Sciences; vol. 235(1200); pp. 67-77; 1956.
Baquiran et al.; Lippincott's Cancer Chemotherapy Handbook; 2nd Ed; Lippincott; Philadelphia; 2001.
Becker et al; Polymer microfabrication methods for microfluidic analytical applications; Electrophoresis; vol. 21; pp. 12-26; 2000.
Belfer et al.; Surface Modification of Commercial Polyamide Reverse Osmosis Membranes; J. Membrane Sci.; 139; pp. 175-181; 1998.
Boerman et al.; Pretargeted radioimmunotherapy of cancer: progress step by step; J. Nucl. Med.; vol. 44; No. 3; pp. 400-411; Mar. 2003.
Braun et al.; Small-angle neutron scattering and cyclic voltammetry study on electrochemically oxidized and reduced pyrolytic carbon; Electrochimica Acta; vol. 49; pp. 1105-1112; 2004.
Burgreen et al.; Electrokinetic flow in ultrafine capillary slits; The Journal of Physical Chemistry, 68(95): pp. 1084-1091 (May 1964).
Chatwin et al.; The effect of aspect ratio on longitudinal diffusivity in rectangular channels; J. Fluid Mech.; vol. 120; pp. 347-358 (1982).
Chu et al.; Physicians Cancer Chemotherapy Drug Manual 2002; Jones and Bartlett Publisheer; Massachusetts; 2002.
Churchill et al.; Complex Variables and Applications; McGraw-Hill, Inc. New York; 1990.

Conway, B.E.; Electrochemical Capacitors Their Nature, Function, and Applications; Electrochemistry Encyclopedia. 2003. (Available at http://electrochem.cwru.edu/ed/encycl/art-c03-elchem-cap.htm. Accessed May 16, 2006).
Conway, B.E.; Electrochemical Supercapacitors Scientific Fundamentals and Technological Applications; Kluwer Academic/Plenum Publishers; pp. 12-13, pp. 104-105, and pp. 192-195; 1999.
Cooke Jr., Claude E.; Study of electrokinetic effects using sinusoidal pressure and voltage; The Journal of Chemical Physics; vol. 23; No. 12; pp. 2299-2300; Dec. 1955.
Dasgupta et al.; Electroosmosis: a reliable fluid propulsion system for flow injection analysis; Anal. Chem.; vol. 66; pp. 1792-1798; 1994.
Doshi et al.; Three dimensional laminar dispersion in open and closed rectangular conduits; Chemical Engineering Science, 33; pp. 795-804 (1978).
Drott et al.; Porous silicon as the carrier matrix in microstructured enzyme reactors yielding high enzyme activities; J. Micromech. Microeng; vol. 7; pp. 14-23 (1997).
Gan et al.; Mechanism of porous core electroosmotic pump flow injection system and its application to determination of chromium(VI) in waste-water; Talanta; vol. 51; pp. 667-675 (2000).
Gennaro, A.R.; Remington: The Science and Practice of Pharmacy (20th ed.); Lippincott Williams & Wilkins. Philadelphia; 2000.
Gleiter et al.; Nanocrystalline Materials: A Way to Solids with Tunable Electronic Structures and Properties?; Acta Mater; 49; pp. 737-745; 2001.
Gongora-Rubio et al.; The utilization of low temperature co-fired ceramics (LTCC-ML) technology for meso-scale EMS, a simple thermistor based flow sensor; Sensors and Actuators; vol. 73; pp. 215-221; 1999.
Goodman and Gilman'S "The Pharmacological Basis of Therapeutics;" (10th Ed.); Hardman et al. (editors); 2001.
Gritsch et al.; Impedance Spectroscopy of Porin and Gramicidin Pores Reconstituted into Supported Lipid Bilayers on Indium-Tin-Oxide Electrodes; Langmuir; 14; pp. 3118-3125; 1998.
Haisma; Direct Bonding in Patent Literature; Philips. J. Res.; vol. 49, pp. 165-170; 1995.
Jackson, J. D.; Classical Electrodynamics 2nd Ed. John Wiley & Sons, Inc. New York. 1962.
Jessensky et al.; Self-organized formation of hexagonal pore structures in anodic alumina; J. Electrochem. Soc.; vol. 145; (11); pp. 3735-3740 (Nov. 1998).
Jimbo et al.; Surface Characterization of Poly(acrylonitrite) Membranes: Graft-Polymerized with Ionic Monomers as Revealed by Zeta Potential Measurements; Macromolecules; vol. 31; pp. 1277-1284; 1998.
Johnson et al.; Dependence of the conductivity of a porous medium on electrolyte conductivity; Physical Review Letters; 37(7); pp. 3502-3510 (Mar. 1, 1988).
Johnson et al.; New pore-size parameter characterizing transport in porous media; Physical Review Letter; 57(20); pp. 2564-2567 (Nov. 17, 1986).
Johnson et al.; Theory of dynamic permeability and tortuosity in fluid-saturated porous media; J. Fluid Mech; 176; pp. 379-402 (1987).
Klein, F.; Affinity Membranes: a 10 Year Review; J. Membrance Sci.; vol. 179; pp. 1-27; 2000.
Kobatake et al.; Flows through charged membranes. I. flip-flop current vs voltage relation; J. Chem. Phys.; 40(8); pp. 2212-2218 (Apr. 1964).
Kobatake et al.; Flows through charged membranes. II. Oscillation phenomena; J. Chem. Phys.; 40(8); pp. 2219-2222 (Apr. 1964).
Kotz et al.; Principles and applications of electrochemical capacitors; Electrochimica Acta; 45; pp. 2483-2498; 2000.
Liu et al.; Electroosmotically pumped capillary flow-injection analysis; Analytica Chimica Acta; vol. 283; pp. 739-745; 1993.
Liu et al.; Flow-injection analysis in the capillary format using electroosmotic pumping; Analytica Chimica Acta; vol. 268; pp. 1-6; 1992.
Ma et al.; A review of zeolite-like porous materials; Microporous and Mesoporous Materials; 37; pp. 243-252 (2000).

Martin et al.; Laminated Plastic Microfluidic Components for Biological and Chemical Systems; J. Vac. Sci. Technol.; vol. A 17; pp. 2264-2269; 1999.

Morrison et al.; Electrokinetic energy conversion in ultrafine capillaries; J. Chem. Phys.; 43; pp. 2111-2115 (1965).

Mroz et al.; Disposable Reference Electrode; Analyst; vol. 123; pp. 1373-1376; 1998.

Nakanishi et al.; Phase separation in silica sol-gel system containing polyacrylic acid; Journal of Crystalline Solids; 139; pp. 1-13 (1992).

Paul et al., Electrokinetic pump application in micro-total analysis systems mechanical actuation to HPLC; Micro Total Analysis Systems, pp. 583-590 (2000).

Paul et al.; Electrokinetic generation of high pressures using porous microstructures; Micro Total Analysis Systems, pp. 49-52 (1998).

Peters et al.; Molded rigid polymer monoliths as separation media for capillary electrochromatography; Anal. Chem.; 69; pp. 3646-3649 (1997).

Philipse, A.P., Solid opaline packings of colloidal silica spheres; Journal of Materials Science Letters; 8; pp. 1371-1373 (1989).

Pretorius et al.; Electro-osmosis: a new concept for high-speed liquid chromatography; Journal of Chromatography; vol. 99; pp. 23-30; 1974.

Rastogi, R.P.; Irreversible thermodynamics of electro-osmotic effects; J. Scient. Ind. Res.; (28); pp. 284-292 (Aug. 1969).

Rice et al.; Electrokinetic flow in a narrow cylindrical capillary; J. Phys. Chem.; 69(11); pp. 4017-4024 (Nov. 1965).

Roberts et al.; UV Laser Machined Polymer Substrates for the Development of Microdiagnostic Systems; Anal. Chem.; vol. 69; pp. 2035-2042; 1997.

Rosen, M.J.; Ch.2—Adsorption of surface-active agents at interfaces: the electrical double layer; Surfactants and Interfacial Phenomena, Second Ed., John Wiley & Sons, pp. 32-107.

Schmid et al.; Electrochemistry of capillary systems with narrow pores V. streaming potential: donnan hindrance of electrolyte transport; J. Membrane Sci.; 150; pp. 197-209 (1998).

Schmid, G.; Electrochemistry of capillary systems with narrow pores. II. Electroosmosis; J. Membrane Sci.; 150; pp. 159-170 (1998).

Skeel, Ronald T. (editor); Handbook of Chemotherapy (6th Ed.); Lippincott Williams & Wilkins; 2003.

Stokes, V. K.; Joining Methods for Plastics and Plastic Composites: An Overview; Poly. Eng. And Sci.; vol. 29; pp. 1310-1324; 1989.

Takata et al.; Modification of Transport Properties of Ion Exchange Membranes; J. Membrance. Sci.; vol. 179; pp. 101-107; 2000.

Taylor, G.; Dispersion of soluble matter in solvent flowing slowly through a tube; Prox. Roy. Soc. (London); 21; pp. 186-203; Mar. 31, 1953.

Uhlig et al.; The electro-osmotic actuation of implantable insulin micropumps; Journal of Biomedical Materials Research; vol. 17; pp. 931-943; 1983.

Van Brunt, Jennifer; Armed antibodies; Signals (online magazine); 11 pgs.; Mar. 5, 2004.

Vinson, J.; Adhesive Bonding of Polymer Composites; Polymer Engineering and Science; vol. 29; No. 19; pp. 1325-1331; Oct. 1989.

Watson et al.; Recent Developments in Hot Plate Welding of Thermoplastics; Poly. Eng. and Sci.; vol. 29; pp. 1382-1386; 1989.

Weston et al.; Instrumentation for high-performance liquid chromatography; HPLC and CE, Principles and Practice, (Chp. 3) pp. 82-85, Academic Press.

Wijnhoven et al.; Preparation of photonic crystals made of air spheres in titania; Science; 281; pp. 802-804 (Aug. 7, 1998).

Yazawa, T., Present status and future potential of preparation of porous glass and its application; Key Engineering Materials; 115; pp. 125-146 (1996).

Anex et al.; U.S. Appl. No. 12/728,844 entitled "Electrokinetic Pump Designs and Drug Delivery Systems," filed Mar. 22, 2010.

Adamcyk et al., Characterization of Polyelectrolyte Multilayers by the Streaming Potential Method, Langmuir, 2004, vol. 20, 10517-10525.

Bello et al; Electroosmosis of polymer solutions in fused silica capillaries; Electrophoresis; vol. 15; pp. 623-626; 1994.

Bings et al.; Microfluidic devices connected to fused-silica capillaries with minimal dead volume; Anal. Chem.; vol. 71; pp. 3292-3296 (1999).

Boger, D.; Demonstration of upper and lower Newtonian fluid behaviour in a pseudoplastic fluid; Nature; vol. 265; pp. 126-128 (1977).

Buchholz et al.; Microchannel DNA sequencing matrices with switchable viscosities; Electrophoresis; vol. 23; pp. 1398-1409; 2002.

Caruso et al.; Investigation of electrostatic interactions in polyelectrolyte multilayer fills: binding of anionic fluorescent probes to layers assemble onto colloids; Macromolecules; vol. 32; pp. 2317-2328 (1999).

Chaiyasut et al.; Estimation of the dissociation constants for functional groups on modified and unmodified gel supports from the relationship between electroosmotic flow velocity and pH; Electrophoresis; vol. 22; pp. 1267-1272; 2001.

Collins, Kim; Charge density-dependent strength of hydration and biological structure; Biophys. J.; vol. 72; pp. 65-76; Jan. 1997.

Decher, Fuzzy Nanoassemblies: Toward Layers Polymeric Multicomposites, Science, 1997, vol. 277, pp. 1232-1237.

DeGennes; Scaling Concepts in Polymer Physics; Cornell U. Press; p. 223; 1979.

Gonzalez et al.; Fluidic interconnects for modular assembly of chemical microsystems; Sensors and Actuators B; vol. 49; pp. 40-45 (1998).

Greene, George et al., Deposition and Wetting Characteristics of Polyelectrolyte Multilayers on Plasma-Modified Porous Polyethylene, Langmuir, 2004, vol. 20, pp. 2739-2745.

Gurau et al.; On the mechanism of the hofmeister effect; J. Am. Chem. Soc.; 2005; vol. 126; pp. 10522-10523.

Hunter; Foundations of Colloid Science vol. II (Oxford Univ. Press, Oxford) pp. 994-1002; (1989).

Jacobasch et al.; Adsorption of ions onto polymer surfaces and its influence on zeta potential and adhesion phenomena, Colloid Polym Sci.; vol. 276: pp. 434-442 (1998).

Jarvis et al.; Fuel cell / electrochemical capacitor hybrid for intermittent high power applications; J. Power Sources; vol. 79; pp. 60-63; 1999.

Jenkins, Donald et al., Viscosity B-Coefficients of Ions in Solution, Chem. Rev. 1995, vol. 95, pp. 2695-2724.

Jomaa et al., Salt-Induced Interdiffusion in Multilayers Films: A Neutron Reflectivity Study, Macromolecules; 2005, vol. 38, pp. 8473-8480.

Jones et al.; The viscosity of aqueous solutions of strong electrolytes with special reference to barium chloride; J. Am. Chem. Soc.; vol. 51; pp. 2950-2964; 1929.

Kiriy, Anton et al., Cascade of Coil-Globule Conformational Transitions of Single Flexible Polyelectrolyte Molecules in Poor Solvent, J. Am. Chem. Soc.; 2002, vol. 124, pp. 13454-13462.

Kopf-Sill; Successes and challenges of lab-on-a-chip; Lab-on-a-Chip 2; pp. 42N-47N (2002).

Losche et al., Detailed structure of molecularly thin polyelectrolyte multilayer films on solid substrates as revealed by neutron reflectometry; Macromolecules; 1998; vol. 31; pp. 8893-8906.

Manz et al.; Electroosmotic pumping and electrophoretic separations for miniaturized chemical analysis systems; J. Micromach. Microeng.; vol. 4; pp. 257-265; 1994.

Mika et al., A new class of polyelectrolyte-filled microfiltration membranes with environmentally controlled porosity, Journal of Membrane Science; 1995, vol. 108, pp. 37-56.

Nittis et al.; A high-pressure interconnect for chemical microsystem applications; Lab-on-a-Chip 1; pp. 148-152 (2001).

Ocvirk et al.; High performance liquid chromatography partially integrated onto a silicon chip; Anal. Methods Instrum.; vol. 2; pp. 74-82 (1995).

Park, Juhyun et al., Polyelectrolyte Multilayer Formation on Neutral Hydrophobic Surfaces, Macromolecules; 2005, vol. 38, pp. 10542-10550.

Salabat et al.; Thermodynamic and transport properties of aqueous trisodium citrate system at 298.15 K; J. Mol. Liq.; vol. 118; pp. 67-70; 2005.

Salomaeki et al., The Hofmeister Anion Effect and the Growth of Polyelectrolyte Multilayers, Langmuir; 2004, vol. 20, pp. 3679-3683.

Sankaranarayanan et al.; Chap. 1: Anatomical and pathological basis of visual inspection with acetic acid (VIA) and with Lugol's iodine (VILI); A Practical Manual on Visual Screening for Cervical Neoplasia; IARC Press; 2003.

Schlenoff et al., Mechanism of polyelectrolyte multilayer growth: charge overcompensation and distribution; Macromolecules; 2002, vol. 34, pp. 592-598.

Schoenhoff, J.; Layered polyelectrolyte complexes: physics of formation and molecular properties, Journal of Physics Condensed Matter; 2003, vol. 15, pp. R1781-1808.

Schweiss et al., Dissociation of Surface Functional Groups and Preferential Adsorption of Ions on Self-Assembled Monolayers Assessed by Streaming Potential and Streaming Current Measurements, Langmuir; 2001, vol. 17, pp. 4304-4311.

Takamura, Y., et al., "Low-Voltage Electroosmosis Pump and Its Application to On-Chip Linear Stepping Pneumatic Pressure Source," Abstract, Micro Total Analysis Systems, 2001, pp. 230-232.

Tuckerman et al.; High-performance heat sinking for VLSI; IEEE Electron Dev. Letts., vol. EDL-2, pp. 126-129; May 1981.

Tusek et al.; Surface characterisation of NH3 plasma treated polyamide 6 foils; Colloids and Surfaces A; vol. 195; pp. 81-95; 2001.

Weidenhammer, Petra et al., Investigation of Adhesion Properties of Polymer Materials by Atomic Force Microscopy and Zeta Potential Measurements, Journal of Colloid and Interface Science, vol. 180, pp. 232-236 (1996).

Wong et al., Swelling Behavior of Polyelectrolyte Multilayers in Saturated Water Vapor, Macromolecules; 2004, vol. 37, pp. 7285-7289.

Kou et al.; Surface modification of microporous polypropylene membranes by plasma-induced graft polyerization of ?-allyl glucoside; Langmuir; vol. 19; pp. 6869-6875; 2003.

Ye et al.; Capillary electrochromatography with a silica column with dynamically modified cationic surfactant; Journal of Chromatography A; vol. 855; pp. 137-145; 1999.

Yezek; Bulk conductivity of soft surface layers: experimental measurement and electrokinetic implications; Langmuir; 2005; vol. 21; pp. 10054-10060.

Yoo et al., Controlling Bilayer Composition and Surface Wettability of Sequentially Adsorbed Multilayers of Weak Polyelectrolytes, Macromolecules; 1998, vol. 31, pp. 4309-4318.

Zeng, S. et al., "Fabrication and characterization of electroosmotic micropumps," Sensors and Actuators, B 79: pp. 107-114 (2001).

Zhang et al.; Specific ion effects on the water solubility of macromolecules: PNIPAM and the Hofmeister series; J. Am. Chem. Soc.; vol. 127; pp. 14505-14510; 2005.

Li et al., Studies on preparation and performances of carbon aerogel electrodes for the application of supercapacitor; Journal of Power Sources; vol. 158; pp. 784-788; 2006.

Krasemann et al.; Self-assembled polyelectrolyte multilayer membranes with highly improved pervaporation separation of ethanol/water mixtures; J of Membrane Science; vol. 181; No. 2; pp. 221-228; 2001.

US 6,406,905, 06/2002, Parce et al. (withdrawn)

ELECTROKINETIC PUMP WITH FIXED STROKE VOLUME

CROSS-REFERENCE TO RELATED APPLICATION

This application claims the benefit of U.S. Provisional Application No. 61/007,357, filed Dec. 11, 2007; which application is incorporated by reference as if fully set forth herein.

FIELD OF THE INVENTION

The present invention generally relates to devices and methods for delivering a volume of fluid with a pump. More specifically, the present invention relates to an electrokinetic pump that delivers a fixed stroke volume of fluid with each stroke.

BACKGROUND OF THE INVENTION

In many diagnostic and therapeutic medical applications (including drug delivery and analyte sampling/monitoring), precise transport of a drug, blood and/or other bio-fluid is important. However, with most conventional diagnostic and therapeutic medical systems, precise movement of large and small aqueous volumes of drugs and other bio-fluids is difficult to achieve. This difficulty arises because conventional systems employ mechanical components to effect fluid transport and delivery. Reconfiguration of these systems to enable highly precise movement of small and large aqueous volumes of a solution containing biomaterials would be impractical, as the complexity of such systems would make their manufacture expensive, time consuming and labor intensive.

Presently, electrokinetic ("EK") or electro-osmotic manipulations of fluids represent the state-of-the art in controlled, high precision, small volume fluid transport and handling. Electro-osmosis involves the application of an electric potential to an electrolyte, in contact with a dielectric surface, to produce a net flow of the electrolyte.

While electro-osmosis has found widespread and wide ranging applications in chemical analysis (e.g., high-speed liquid chromatography and other chemical separation procedures), its medical applications, such as for drug delivery and analyte sampling, have been limited, despite its advantages over conventional, mechanical approaches. Design challenges, including accurately delivering a target flow rate over time, accumulation of charge on EK electrodes above a threshold value leading to pump fluid degradation (e.g., ~±1.2 volts for water), and managing EK pump pressure, need to be overcome. When configured for non-medical use, these drawbacks do not pose major issues because the consequences are minimal, unlike in medical applications.

Accordingly, the present invention is directed to low-cost, high precision, reliable and compact EK pumps and systems adapted for medical applications, including, but not limited to, drug delivery and/or analyte sampling.

SUMMARY OF THE INVENTION

Generally, the present invention contemplates the use of controlled electrokinetic fluid flow techniques for efficient, reliable, and highly precise movement of a pump fluid. In addition, various low-cost, precise, reliable, and compact medical systems and devices for drug delivery and analyte sampling are provided.

One aspect of the invention provides an EK pump comprising a porous dielectric material disposed between a pair of capacitive electrodes and a first and second chamber each including a movable member. In one embodiment, the first movable member comprises a piston and the second movable member comprises a flexible impermeable diaphragm. Pump fluid moves between the first and second chambers through the porous dielectric material by electro-osmosis when a voltage is applied to the EK pump. The EK pump is designed to occlude when a fixed volume of fluid is moved between the chambers.

Another aspect of the invention provides a fluid delivery system including an EK pump and a fluid delivery cartridge. The fluid delivery cartridge is coupled to the EK pump and is designed to deliver a fixed volume of delivery fluid corresponding to the movement of a fixed volume of pump fluid between the first and second chambers of the EK pump. This is achieved by causing a compression chamber of the fluid delivery cartridge to contract when the second chamber of the EK pump expands. In some embodiments, the fluid delivery system includes a third movable member and the EK pump is detachable from the fluid delivery cartridge.

Yet another aspect of the invention provides a method of pumping a fixed stroke volume of fluid with an EK pump under all operating conditions. The method includes the steps of applying a forward voltage to the EK pump for a stroke period; allowing the EK pump to occlude for a forward occlude period without degrading a pump fluid; applying a reverse voltage to the EK pump for the stroke period; and allowing the EK pump to occlude for a reverse occlusion period without degrading the pump fluid.

One aspect of the invention provides a method for managing a stored charge on the capacitive electrodes of a one-directional EK pump. The method includes the steps of applying a forward voltage to a pair of capacitive electrodes to move pump fluid by electro-osmosis; measuring the accumulated charge on the pair of capacitive electrodes; applying a reverse voltage to the pair of capacitive electrodes when the accumulated charge exceeds a threshold value; creating an occlusion condition to discharge the pair of capacitive electrodes; and applying a forward voltage to the pair of capacitive electrodes to resume moving the pump fluid by electro-osmosis.

Other embodiments provide methods for managing a stored charge on the capacitive electrodes of a reciprocating EK pump. In one method, the forward and reverse voltages are increased or decreased to balance the accumulated charge on the capacitive electrodes. In another method, the duration and frequency of a pulsed voltage can be increased or decreased to balance the accumulated charge on the capacitive electrodes. In yet another method, the duration of the forward and reverse stroke periods can be adjusted to balance the accumulated charge on the capacitive electrodes. In one method, the voltage applied during an occlusion period can be adjusted to balance the accumulated charge on the capacitive electrodes.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Certain specific details are set forth in the following description and figures to provide an understanding of various embodiments of the invention. Certain well-known details, associated electronics and devices are not set forth in the following disclosure to avoid unnecessarily obscuring the various embodiments of the invention. Further, those of ordinary skill in the relevant art will understand that they can practice other embodiments of the invention without one or more of the details described below. Finally, while various processes are described with reference to steps and sequences in the following disclosure, the description is for providing a clear implementation of particular embodiments of the invention, and the steps and sequences of steps should not be taken as required to practice this invention.

Figure 1A:
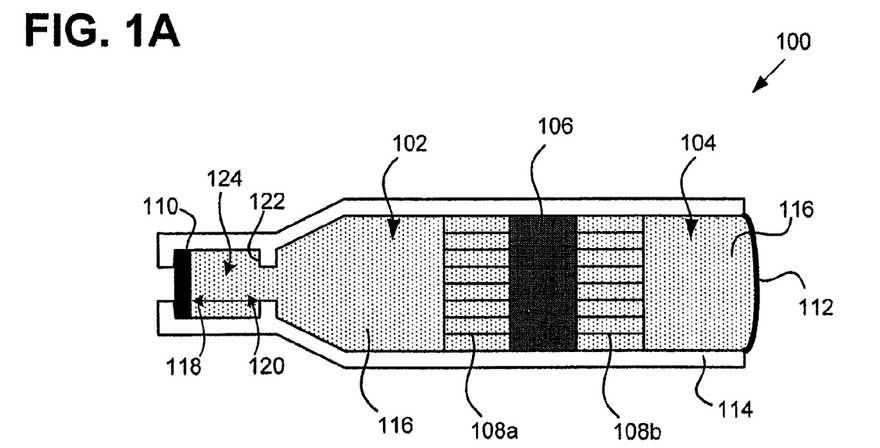
FIGS. 1A-1B illustrate cross-sectional views of one embodiment of a fixed stroke electrokinetic pump.
Figure 1B:
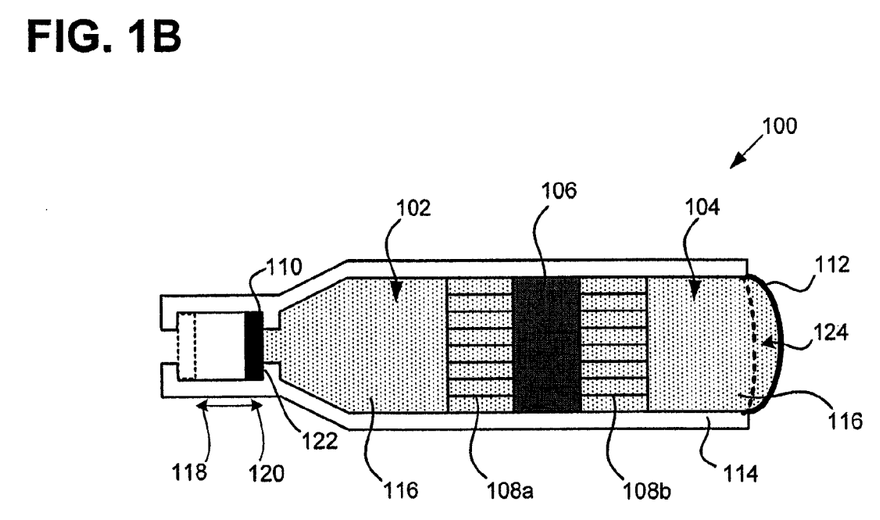

FIG. 1A is a cross-sectional view of a compact EK pump 100. In this example, EK pump 100 comprises first chamber 102 and second chamber 104 separated by porous dielectric material 106, which provides a fluidic path between first chamber 102 and second chamber 104. Capacitive electrodes 108a and 108b are disposed within the first and second chambers, respectively, and are situated adjacent to or near each side of porous dielectric material 106. EK pump 100 includes first movable member 110 and second movable member 112 at each end of EK housing 114. As shown in FIGS. 1A and 1B, movable member 110 is a piston and movable member 112 is a flexible impermeable diaphragm. However, in other embodiments, movable members 110 and 112 can both be either pistons or flexible impermeable diaphragms, for example.

First and second chambers 102 and 104, including the space between porous dielectric material 106 and capacitive electrodes 108a and 108b, are filled with an electrolyte or pump fluid 116. The pump fluid may flow through or around electrodes 108a and 108b. Capacitive electrodes 108a and 108b are connected to an external voltage source (not shown) by lead wires or other conductive media through EK housing 114.

Operation of EK pump 100 will now be discussed. As shown in FIG. 1A, first movable member 110 comprises a piston and is situated at starting limit 118. A voltage correlating to a desired flow rate and pressure profile of EK pump 100 (i.e., a forward voltage) is applied to capacitive electrodes 108a and 108b to move pump fluid 116 from first chamber 102 to second chamber 104 through porous dielectric material 106 by electro-osmosis. A controller (not shown) can be programmed to apply the forward voltage to the capacitive electrodes, for example. A leading edge of first movable member 110 is in fluid communication with pump fluid 116 in first chamber 102, and is pulled from starting limit 118 to ending limit 120, where housing stops 122 prevent further forward movement of first movable member 110. When the leading edge of first movable member 110 reaches ending limit 120, a fixed stroke volume 124 of pump fluid 116 has been moved from first chamber 102 to second chamber 104. The voltage applied to EK pump 100 can be a square wave voltage, for example. In one embodiment, the voltage can be applied pulsatively, where the pulse duration and frequency can be adjusted to change the flow rate of EK pump 100.

In FIG. 1B, first movable member 110 is shown resting against housing stops 122 at ending limit 120. The movement of pump fluid 116 from first chamber 102 to second chamber 104 causes second movable member 112 to expand from a retracted position (as shown in FIG. 1A) to an extended position (as shown in FIG. 1B) to compensate for the additional volume of pump fluid 116 in second chamber 104. The volume by which second chamber 104 expands when second movable member 112 is in the extended position is equal to the fixed stroke volume 124.

In the embodiment described above, the first movable member 110 is used to fix the volume displaced during each stroke of the EK pump. However, in an alternative embodiment, the second movable member can fix the volume displaced. For example, if the second movable member comprises a diaphragm made of a thin polymer with a low bending stiffness but a large membrane stiffness, the second movable member can control the volume displaced by the EK pump when it is fully extended or retracted.

The flow direction of pump fluid 116 can be reversed by toggling the polarity of the applied voltage to capacitive electrodes 108a and 108b. Thus, applying a reverse voltage (i.e., toggling the polarity of the forward voltage) to the EK pump 100 causes pump fluid 116 to flow from second chamber 104 to first chamber 102. Similar to as described above, the leading edge of first movable member 110 is pushed from ending limit 120 to starting limit 118 until first movable member 110 reaches the end of EK housing 114. Second movable member 112 collapses from an extended position (as shown in FIG. 1B) to a retracted position (as shown in FIG. 1A), where the volume by which second chamber 104 decreases when second movable member 112 retracts is equal to the fixed stroke volume 124. Thus, EK pump 100 can be used in a reciprocating manner by alternating the polarity of the voltage applied to capacitive electrodes 108a and 108b to repeatedly move pump fluid 116 back and forth between the two chambers.

Figure 2A:
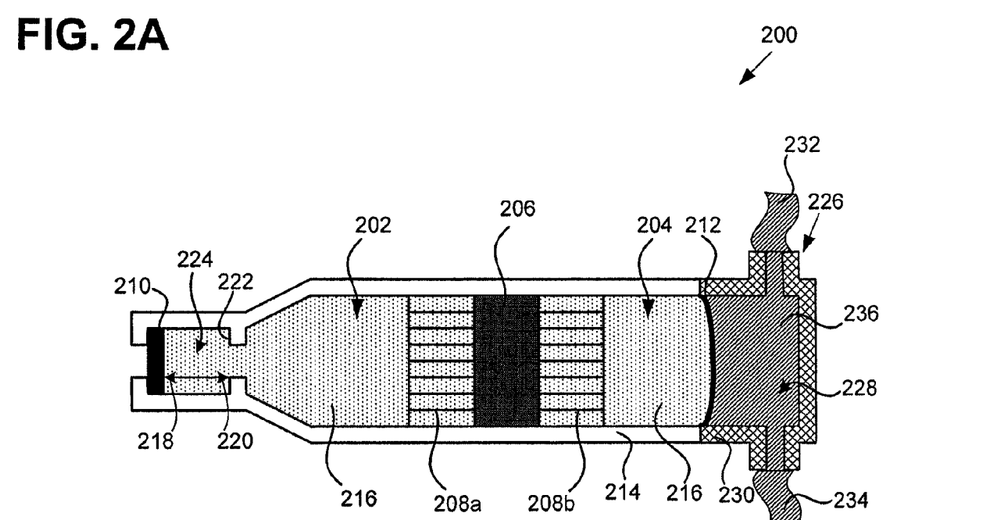
FIGS. 2A-2B illustrate cross-sectional views of one embodiment of a fluid delivery system comprising a fixed stroke electrokinetic pump.
Figure 2B:
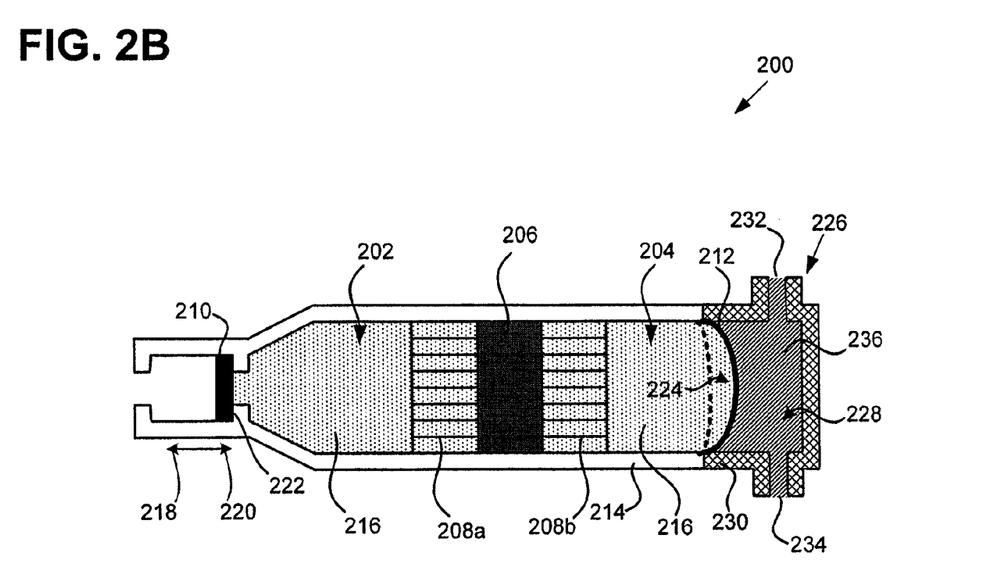

FIGS. 2A and 2B are cross sectional views of a fluid delivery system 200. The fluid delivery system 200 can include EK pump 100 of FIGS. 1A and 1B, thus first chamber 202, second chamber 204, porous dielectric material 206, capacitive electrodes 208a and 208b, first movable member 210, second movable member 212, EK housing 214, pump fluid 216, starting limit 218, ending limit 220, housing stops 222, and fixed stroke volume 224 of FIGS. 2A and 2B correspond, respectively, to the elements of EK pump 100 described above. Fluid delivery system 200 further comprises fluid delivery cartridge 226 coupled to the EK pump.

Fluid delivery cartridge 226 comprises compression chamber 228, cartridge housing 230, inlet port 232, and outlet port 234. As shown in FIGS. 2A and 2B, compression chamber 228 is filled with a delivery fluid 236. When fluid delivery system 200 is used as a drug administration set, the inlet port 232 can be connected to a drug supply (not shown) and the outlet port 234 can be connected to a patient (not shown), and can include all clinically relevant accessories such as tubing, air filters, slide clamps, and back check valves, for example. Inlet port 232 and outlet port 234 can be passive (i.e., check valves) or active, for example.

As shown in FIGS. 2A and 2B, second movable member 212 is situated between second chamber 204 of the EK pump and compression chamber 228 of fluid delivery cartridge 226. In one embodiment, second movable member 212 is in fluid communication with both pump fluid 216 of second chamber 204 and delivery fluid 236 of compression chamber 228. In an alternative embodiment, the EK pump is detachable from fluid delivery cartridge 226. In the alternative embodiment, fluid delivery cartridge 226 further comprises a third movable member (not shown) mated to second movable member 212 of the EK pump. Thus, in this embodiment, second movable member 212 is in fluid communication with only pump fluid 216, and the third movable member is in fluid communication with only delivery fluid 236. The second and third movable elements mirror each other's movement when pump fluid flows between the first and second chambers. When cartridge housing 230 of fluid delivery cartridge 226 is detached from the EK pump, the second and third movable members keep the pump fluid and delivery fluid contained within their respective chambers.

Figure 3:
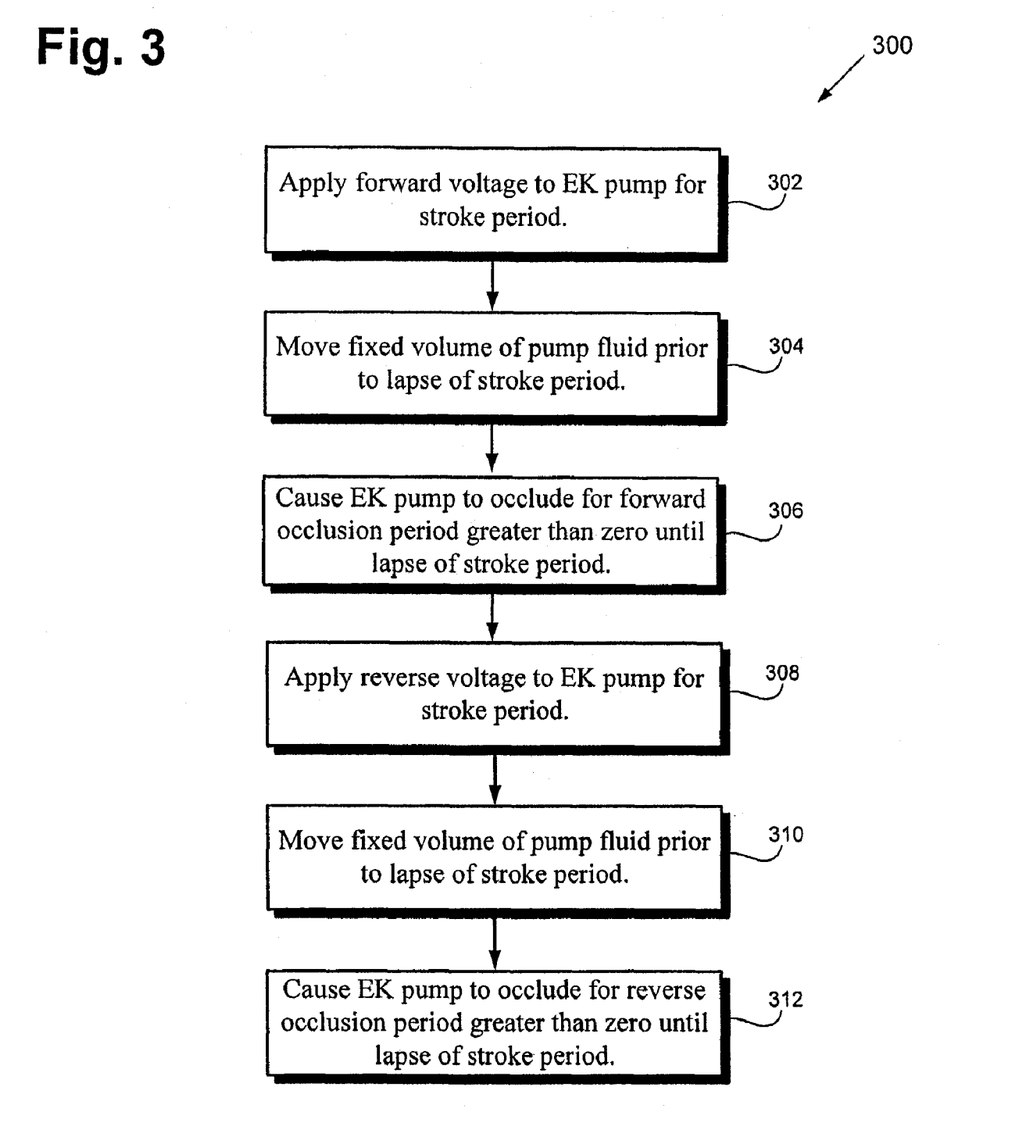
FIG. 3 is a flowchart illustrating steps taken to pump a fixed stroke volume of fluid over a stroke period according to one embodiment of the present invention.

FIG. 3 shows a flowchart illustrating an exemplary method of pumping a fixed stroke volume of fluid over a stroke period according to an embodiment of the present invention. Certain details and features have been left out of flowchart 300 that are apparent to a person of ordinary skill in the art. For example, a step may consist of one or more substeps or may involve specialized equipment or materials, as known in the art.

The following description of flowchart 300 includes references to fluid delivery system 200 of FIGS. 2A and 2B, since the method steps in flow chart 300 are implemented utilizing a system such as fluid delivery system 200. At step 302 of flowchart 300, first movable member 210 is situated at starting limit 218, second movable member 212 is in a retracted position, inlet port 232 is closed, and outlet port 234 is open. A forward voltage correlating to a desired flow rate and pressure profile is applied to capacitive electrodes 208a and 208b for a predetermined stroke period, which is calculated to achieve a target flow rate in fluid delivery system 200 for a given fixed stroke volume 224 and operating voltage.

A controller (not shown) can be programmed to apply the forward voltage to the capacitive electrodes, for example. The duration of the stroke period varies depending on the operating conditions of the fluid delivery system 200, which includes the EK pump parameters such as material properties and geometric tolerances as well as loads on fluid delivery system 200 such as back pressure and the viscosities of pump fluid 216 and delivery fluid 236. The stroke period must be calculated such that even under the most extreme circumstances, the fixed stroke volume 224 of pump fluid 216 will be moved between first chamber 202 and second chamber 204 during the stroke period. The following table provides an example of the voltages and frequencies that can be applied to the capacitive electrodes to achieve a desired flow rate from the EK pump:

| Flow Rate (mL/hour) | Minimum Required Voltage Magnitude (Volts) | Squarewave Frequency (HZ) |
| --- | --- | --- |
| 0.5 | ±2.0 | 0.0046 |
| 1.0 | ±3.0 | 0.0093 |

-continued

| Flow Rate (mL/hour) | Minimum Required Voltage Magnitude (Volts) | Squarewave Frequency (HZ) |
| --- | --- | --- |
| 2.5 | ±4.0 | 0.0231 |
| 5.0 | ±6.0 | 0.0463 |
| 10.0 | ±12.0 | 0.0926 |

At step 304 of flowchart 300, the leading edge of first movable member 210, being in fluid communication with pump fluid 216, is moved from starting limit 218 to ending limit 220 prior to lapse of the stroke period as pump fluid 216 moves between the first and second chambers. The increased volume of pump fluid 216 in second chamber 204 causes second movable member 212 to extend from a retracted position (as shown in FIG. 2A) to an extended position (as shown in FIG. 2B). As second movable member 212 extends and second chamber 204 expands by the fixed stroke volume 224, compression chamber 228 contracts by the same fixed stroke volume 224, which causes a fixed stroke volume 224 of delivery fluid 236 to be displaced through outlet port 234.

At step 306 of flowchart 300, the EK pump of fluid delivery system 200 occlusions for a forward occlusion period greater than zero until lapse of the stroke period. When the leading edge of first movable member 210 reaches ending limit 220, the movement of pump fluid 216 is severely restricted and the EK pump of fluid delivery system 200 occlusions. During this occlusion period, the EK pump generates a large pressure differential across porous membrane 206 but the net flow of pump fluid 216 through porous membrane 206 is zero. To ensure that the fixed stroke volume 224 of pump fluid 216 is moved between the first and second chambers, the forward occlusion period must always be greater than zero over the range of expected operating conditions. However, operating the EK pump for an extended time can create an accumulated charge on capacitive electrodes 208a and 208b. When the accumulated charge exceeds a threshold value (i.e., ±1.2 volts for water), the pump fluid degrades and EK pump performance suffers. Furthermore, once the EK pump is occluded, the pump operates towards a stall condition by pushing the pump fluid ions out of the porous membrane without replenishing them. During occlusion, the current steadily decreases over time to zero. This condition is referred to as the stall condition when ionic content of pump fluid inside the porous membrane is substantially depleted. A stalled pump cannot be restarted until the ions content of the pump fluid is restored. Thus, the forward occlusion period and stroke period must end before degradation of the pump fluid can occur or the pump is stalled.

At step 308 of flowchart 300 first movable member 210 is situated at ending limit 220, second movable member 212 is in an expanded position, inlet port 232 is open, and outlet port 234 is closed. A reverse voltage correlating to the desired flow rate and pressure profile is applied to capacitive electrodes 208a and 208b for the predetermined stroke period. A controller (not shown) can be programmed to apply the reverse voltage to the capacitive electrodes, for example.

At step 310 of flowchart 300, the leading edge of first movable member 210, being in fluid communication with pump fluid 216, is moved from ending limit 220 to starting limit 218 prior to lapse of the stroke period as pump fluid 216 moves between the second and first chambers. The decreased volume of pump fluid 216 in second chamber 204 causes second movable member 212 to collapse from an extended position (as shown in FIG. 2B) to a retracted position (as shown in FIG. 2A). As second movable member 212 collapses and second chamber 204 contracts by the fixed stroke volume 224, compression chamber 228 expands by the same fixed stroke volume 224, which causes a fixed stroke volume 224 of delivery fluid 236 to be drawn into the compression chamber through inlet port 232.

At step 312 of flowchart 300, the EK pump of fluid delivery system 200 occlusions for a reverse occlusion period greater than zero until lapse of the stroke period. When the leading edge of first movable member 210 reaches starting limit 218, the movement of pump fluid 216 is severely restricted and the EK pump of fluid delivery system 200 occlusions. During this occlusion period, the EK pump generates a large pressure differential across porous membrane 206 but the net flow of pump fluid 216 through porous membrane 206 is zero. To ensure that the fixed stroke volume 224 of pump fluid 216 is moved between the second and first chambers, the reverse occlusion period must always be greater than zero over the range of expected operating conditions. Since the polarity of the applied voltage is reversed in this step, the accumulated charge on the electrodes described above is discharged before charge builds up on the other electrode. However, a charge can still accumulate on the capacitive electrodes during operation if the reverse occlusion period is too long, leading to degradation of the pump fluid. Thus, the reverse occlusion period and stroke period must also end before degradation of the pump fluid can occur.

During the occlusion period described above, the EK pump generates a large pressure differential across porous membrane 206, but the net flow of pump fluid 216 through porous membrane 206 is zero. In one embodiment, the occlusion pressure across porous membrane 206 can equal approximately 4.3 psi per applied volt to the EK pump. In this embodiment, an EK pump having a flow rate of 10 mL/hr and a fixed stroke volume of 30 μL can have a pressure differential in excess of 40 psi, which is undesirable. A reciprocating EK pump operating continuously for three days must be able to withstand approximately 1300 to 3900 complete reversals.

One way of ensuring that the EK pump can operate continuously for this time period is to modify the applied square wave voltage to have two steps in each direction. For example, during a first step, a higher voltage is applied to the EK pump. During a second step, the voltage is reduced so that under all conditions the occlusion pressure is less than a target pressure, which can be approximately 20 psi. The timing of the voltage stepping can be incorporated in a number of ways. In one embodiment, the duration of both the first and second steps are fixed, and the stepping durations are calculated so the EK pump reaches an occlusion period under all operating conditions. In an alternative embodiment, when first movable member 210 of the EK pump reaches housing stops 222, the fluid delivery system 200 can incorporate an occlusion indication switch (not shown) that indicates a stall period is imminent and applies the lower second stepping voltage. As described above, backpressure is an example of a system load, but is not the only parameter the system must be designed to compensate for.

Figure 4:
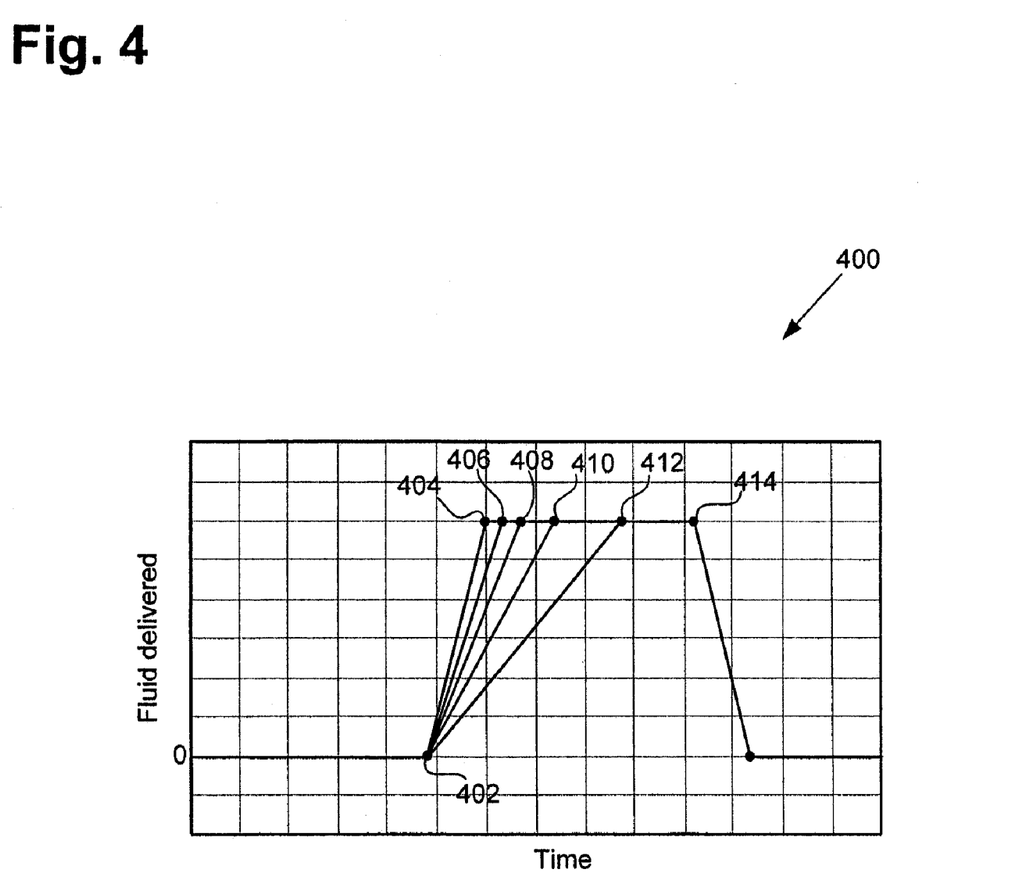
FIG. 4 shows a plot displaying the occlusion period of a fixed stroke electrokinetic pump against a range of backpressures in accordance with one embodiment of the present invention.

FIG. 4 shows a plot 400 displaying the occlusion period of a fixed stroke electrokinetic pump against a range of backpressures in accordance with one embodiment of the present invention. The following description of plot 400 includes references to fluid delivery system 200 of FIGS. 2A and 2B. The time from point 402 to point 414 on plot 400 represents the stroke period calculated to move a fixed stroke volume 224 of pump fluid 216 under all operating conditions.

At point 402, fluid delivery system 200 is configured as shown in FIG. 2A. A forward voltage is applied to fluid delivery system 200 for the predetermined stroke period, causing pump fluid 216 to move from first chamber 202 to second chamber 204, as described above. The EK pump enters an occlusion that period when first movable member 210 reaches ending limit 220, where the duration of the occlusion period is greater than zero and equals the remainder of the stroke period. The amount of backpressure in the system affects how quickly fluid delivery system 200 moves the fixed stroke volume 224 of pump fluid 216 between the chambers, and thus determines the duration of the resulting occlusion period.

For example, as shown in FIG. 4, when the backpressure is 0 psi, the fixed stroke volume 224 of pump fluid 216 is moved between the chambers in the time from point 402 to point 404, and the resulting occlusion period lasts from point 404 to point 414. When the backpressure is 2 psi, the fixed stroke volume 224 of pump fluid 216 is moved between the chambers in the time from point 402 to point 406, and the resulting occlusion period lasts from point 406 to point 414. Similarly, the time from point 402 to points 408, 410, and 412 represents the amount of time it takes fluid delivery system 200 to occlude when there is 4 psi, 6 psi, and 8 psi of backpressure, respectively. It can be seen that as the backpressure increases, the time it takes to deliver the fixed stroke volume 224 of pump fluid 216 increases, and the duration of the occlusion period decreases. In other words, the occlusion period is greatest at a lower end of the range of backpressures and least at a higher end of the range of backpressures. Therefore, a stroke period must be selected to compensate for even the most extreme operating conditions to ensure that the fixed stroke volume 224 of pump fluid 216 is always moved completely between the chambers during the stroke period. When conditions are less than extreme, the fluid delivery system moves the fixed stroke volume 224 of pump fluid 216 at a faster rate, and the resulting occlusion period is longer.

Figure 5:
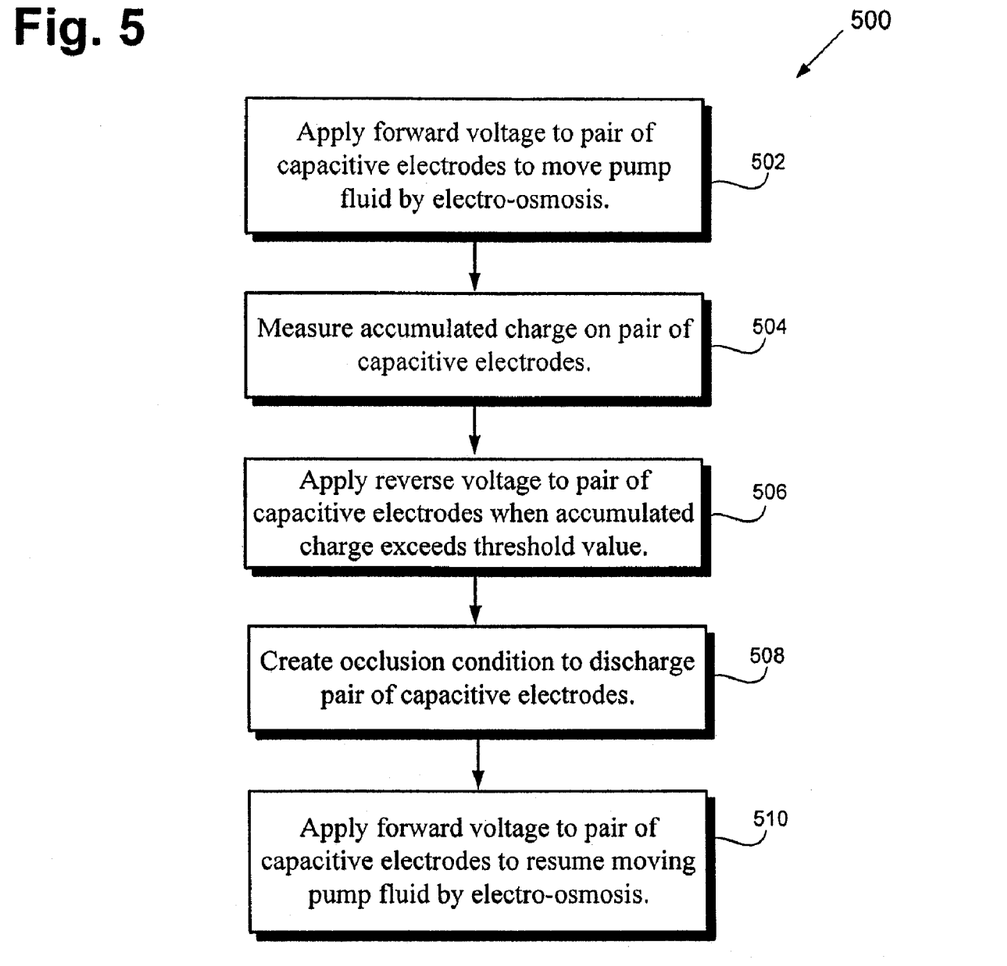
FIG. 5 is a flowchart illustrating steps taken to manage an accumulated charge in an electrokinetic pump according to one embodiment of the present invention.

FIG. 5 shows a flowchart illustrating an exemplary method of managing an accumulated charge on a pair of capacitive electrodes in a one-directional electrokinetic pump according to an embodiment of the present invention. The charge management system described below can be achieved using a closed loop feedback control system built into the EK pump. Certain details and features have been left out of flowchart 500 that are apparent to a person of ordinary skill in the art. For example, a step may consist of one or more substeps or may involve specialized equipment or materials, as known in the art.

Figure 6:
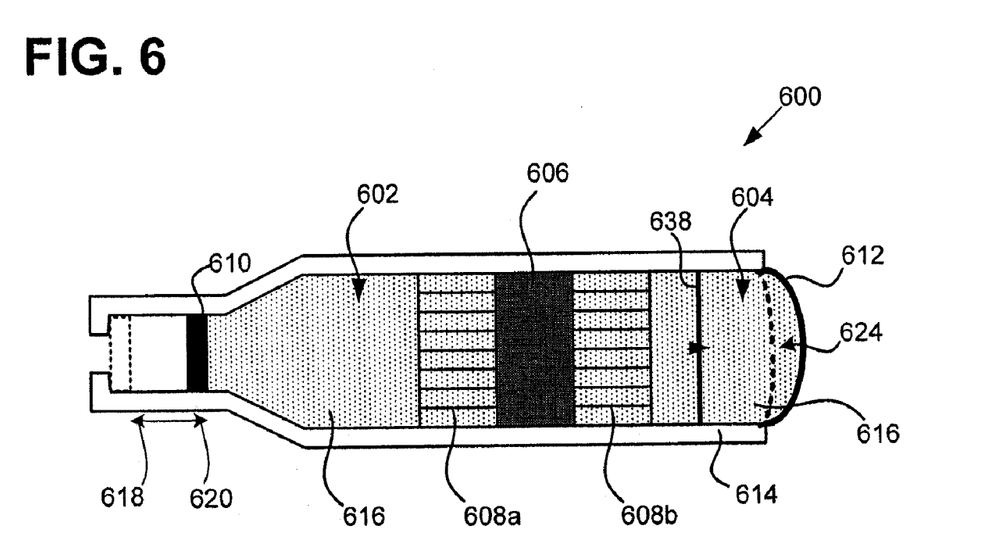
FIG. 6 illustrates a cross-sectional view of one embodiment of an electrokinetic pump utilized to manage an accumulated charge according to one embodiment of the present invention.

The following description of flowchart 500 includes references to EK pump 600 of FIG. 6, since the method steps in flow chart 500 are implemented utilizing a system such as EK pump 600. EK pump 600 is a one-directional EK pump that includes all the elements of EK pump 100 described above, and further comprises one-way valve 638 situated in second chamber 604. One-way valve 638 allows pump fluid 616 to flow only in one direction, i.e., from left to right as indicated by the arrow in FIG. 6.

At step 502 of flowchart 500, a forward voltage is applied to capacitive electrodes 608a and 608b to move pump fluid 616 from first chamber 602 to second chamber 604 by electroosmosis. As pump fluid 616 flows into second chamber 604 and through one-way valve 638, second movable member 612 expands as described above. During operation of the EK pump, a charge can accumulate on capacitive electrodes 608a and 608b. For a given net flow rate, a charge typically accumulates on the capacitive electrodes at a higher rate when system backpressure is larger.

At step 504 of flowchart 500, the accumulated charge on capacitive electrodes 608a and 608b is measured. This measurement can be performed in a manner similar to the method described in an article by Jun Li, et al., Studies on Preparation and Performances of Carbon Aero-gel Electrodes for the Application of Super-capacitor, which is incorporated by reference. Step 504 can be performed during each stroke of the one-directional EK pump, or it can be performed intermittently. For example, if capacitive electrodes 608a and 608b accumulate 0.1 volts per stroke, they are likely to reach the theoretical limit of 1.2 volts in 12 strokes. Performing step 504 every 3-4 strokes under these conditions would be adequate.

At step 506 of flowchart 500, a reverse voltage is applied to capacitive electrodes 608a and 608b when the accumulated charge on the capacitive electrodes exceeds a threshold value. As described above, when pump fluid 616 comprises water, the threshold value is approximately 1.2 volts. At step 508 of flowchart 500, an occlusion condition is created to discharge the accumulated charge from the capacitive electrodes. This can be accomplished by closing one-way valve 638 to prevent pump fluid 616 from flowing from second chamber 604 to first chamber 602. Since no pump fluid 616 is moving between the chambers, the one-directional EK pump occludes, which discharges the accumulated charge on capacitive electrodes 608a and 608b.

Finally, at step 510 of flowchart 500, the forward voltage is once again applied to capacitive electrodes 608a and 608b to resume moving pump fluid 616 from first chamber 602 to second chamber 604 and complete delivery of pump fluid 616. Thus, the method of flowchart 500 advantageously manages the accumulated charge on capacitive electrodes 608a and 608b without affecting the net volume or accuracy of pump fluid moved between first chamber 602 and second chamber 604.

The method described in FIGS. 5 and 6 can also be modified to manage accumulated charge in the capacitive electrodes of a reciprocating EK pump. One method of compensating for a net charge on the capacitive electrodes is to increase or decrease the forward and reverse voltages applied to the capacitive electrodes during operation of the reciprocating EK pump. For example, when a positive charge accumulates on the capacitive electrodes during operation, the reverse voltage (i.e., the voltage that causes pump to flow from the second chamber to the first chamber) can be increased to balance the accumulated charge. Conversely, when a negative charge accumulates on the capacitive electrodes during operation, the forward voltage (i.e., the voltage that causes pump fluid to flow from the first chamber to the second chamber) can be increased to balance the accumulated charge.

When a pulsed voltage is used to drive the EK pump, the net charge on the capacitive electrodes can be balanced in a manner similar to as described above. For example, when a positive charge accumulates on the capacitive electrodes during operation, the duration or frequency of the pulsed voltage in the reverse direction (i.e., the voltage that causes pump fluid to flow from the second chamber to the first chamber) can be increased. Conversely, when a negative charge accumulates on the capacitive electrodes during operation, the duration or frequency of the pulsed voltage in the forward direction (i.e., the voltage that causes pump fluid to flow from the first chamber to the second chamber) can be increased.

The timing of the forward and reverse stroke periods can also be changed to compensate for positive or negative accumulated charges on the capacitive electrodes. For example, when a positive charge accumulates on the capacitive electrodes during operation, the duration of the reverse stroke period can be increased and the duration of the forward stroke period decreased such that the overall stroke period remains the same, to balance the accumulated charge on the capacitive electrodes. Conversely, when a negative charge accumulates on the capacitive electrodes during operation, the duration of the forward stroke period can be increased and the duration of the reverse stroke period decreased such that the overall stroke period remains the same, to balance the accumulated charge on the capacitive electrodes.

Accumulated charge can also be managed when a square wave voltage having two steps is applied to the capacitive electrodes. As described above, the second voltage step can be designed to occur when the EK pump is occluding. Thus, the applied voltage during the occlusion period can be increased or decreased to balance accumulated charge on the capacitive electrodes without affecting the overall flow rate of the EK pump. For example, to balance a positive accumulated charge, the second step of the reverse voltage (i.e., during the reverse occlusion period) can be increased. Conversely, to balance a negative accumulated charge, the second step of the forward voltage (i.e., during the forward occlusion period) can be increased. Varying the voltage applied during the occlusion period according to this method advantageously balances an accumulated charge on the capacitive electrodes while allowing the EK pump to continue to deliver fluid at the target flow rate.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

It is intended that the following claims define the scope of the invention and that methods and structures within the scope of these claims and their equivalents be covered thereby.

What is claimed is:

1. A method of pumping a fixed stroke volume of fluid with an electrokinetic pump, the method comprising:
    applying a forward voltage across a pair of electrodes for only a portion of a forward stroke period to move a pump fluid from a first chamber to a second chamber such that a first movable member in fluid communication with the first chamber moves from a starting limit to an ending limit prior to lapse of the forward stroke period; and
    continuing to apply a forward voltage across the pair of electrodes without moving the pump fluid for a forward occlusion period until lapse of the remaining portion of the forward stroke period without degrading the pump fluid.

2. The method of claim 1 further comprising moving a second movable member in fluid communication with the pump fluid to move a fixed volume of delivery fluid through a pump outlet.

3. The method of claim 2, wherein the step of moving a second movable member comprises moving the fixed volume of delivery fluid through the pump outlet against a back pressure, wherein the forward occlusion period is longer at low back pressures and shorter at high back pressures.

4. The method of claim 2 wherein the second movable member is a flexible impermeable diaphragm.

5. The method of claim 2 wherein the second movable member is a piston.

6. The method of claim 1 further comprising the steps of:
applying a reverse voltage across the pair of electrodes for only a portion of a reverse stroke period to move the pump fluid from the second chamber to the first chamber such that the first movable member moves from the ending limit to the starting limit prior to lapse of the reverse stroke period; and
continuing to apply the reverse voltage across the pair of electrodes without moving the pump fluid for a reverse occlusion period until lapse of the remaining portion of the reverse stroke period without degrading the pump fluid.

7. The method of claim 1 wherein the first movable member is a piston.

8. The method of claim 1 wherein the first movable member is a flexible impermeable diaphragm.

9. The method of claim 1 wherein the forward voltage is a square wave voltage.

10. The method of claim 1 wherein the forward voltage is applied pulsatively.

11. The method of claim 1 wherein the forward voltage is a two-step square wave voltage.

12. The method of claim 6 wherein the reverse voltage is a square wave voltage.

13. The method of claim 6 wherein the reverse voltage is applied pulsatively.

14. The method of claim 6 wherein the reverse voltage is a two-step square wave voltage.

15. A fluid delivery system, comprising:
an electrokinetic pump filled with a pump fluid and comprising a first chamber separated from a second chamber by a porous dielectric material disposed between a pair of capacitive electrodes, wherein the first chamber contains a first movable member in fluid communication with the pump fluid and the second chamber contains a second movable member in fluid communication with the pump fluid; and
a fluid delivery cartridge filled with a delivery fluid and comprising a compression chamber, the fluid delivery cartridge coupled to the electrokinetic pump, wherein the second movable member is disposed between the second chamber and the compression chamber, the compression chamber having a fluid inlet and a fluid outlet; and
a controller programmed to apply a forward voltage across the pair of capacitive electrodes for a stroke period, the stroke period comprising the time to displace a fixed stroke volume of the delivery fluid from the fluid delivery cartridge through the fluid outlet and a nonzero time when the net pump fluid flow across the porous dielectric material is zero.

16. The fluid delivery system of claim 15 wherein applying the forward voltage causes the second chamber to expand by the fixed stroke volume, thereby causing the compression chamber to contract by the fixed stroke volume.

17. The fluid delivery system of claim 16 wherein the second movable member extends from a retracted position to an extended position when the second chamber expands.

18. The fluid delivery system of claim 15 wherein the controller is further programmed to apply a reverse voltage across the pair of capacitive electrodes for the stroke period to draw into the fluid delivery cartridge through the fluid inlet the fixed stroke volume of the delivery fluid.

19. The fluid delivery system of claim 18 wherein applying the reverse voltage causes the second chamber to contract by the fixed stroke volume, thereby causing the compression chamber to expand by the fixed stroke volume.

20. The fluid delivery system of claim 19 wherein the second movable member collapses from an extended position to a retracted position when the second chamber contracts.

21. The fluid delivery system of claim 15 wherein the fluid delivery cartridge further comprises a third movable member, wherein the fluid delivery cartridge is detachable from the electrokinetic pump.

22. The fluid delivery system of claim 21 wherein the third movable member is mated to the second movable member when the fluid delivery cartridge is coupled to the electrokinetic pump.

23. The fluid delivery system of claim 15 wherein the first movable member is a piston.

24. The fluid delivery system of claim 15 wherein the first movable member is a flexible impermeable diaphragm.

25. The fluid delivery system of claim 15 wherein the second movable member is a piston.

26. The fluid delivery system of claim 15 wherein the second movable member is a flexible impermeable diaphragm.

27. The fluid delivery system of claim 15 wherein the forward voltage is a square wave voltage.

28. The fluid delivery system of claim 15 wherein the forward voltage is applied pulsatively.

29. The fluid delivery system of claim 15 wherein the forward voltage is a two-step square wave voltage.

30. The fluid delivery system of claim 18 wherein the reverse voltage is a square wave voltage.

31. The fluid delivery system of claim 18 wherein the reverse voltage is applied pulsatively.

32. The fluid delivery system of claim 18 wherein the reverse voltage is a two-step square wave voltage.

33. A method of managing an accumulated charge on a pair of capacitive electrodes in a one-directional electrokinetic pump, the method comprising:
applying a forward voltage to the pair of capacitive electrodes to move a pump fluid from a first chamber to a second chamber by electro-osmosis through a porous membrane;
measuring the accumulated charge on the pair of capacitive electrodes; and
applying a reverse voltage to the pair of capacitive electrodes when the accumulated charge exceeds a threshold value to discharge the pair of capacitive electrodes and generate a differential pressure across the porous membrane without net pump fluid movement through the porous membrane.

34. The method of claim 33 further comprising applying forward voltage to the pair of capacitive electrodes to resume moving the pump fluid from the first chamber to the second chamber after the step of applying a reverse voltage.

35. The method of claim 33, wherein a one-way valve disposed in the second chamber prevents the pump fluid from moving from the second chamber to the first chamber during the step of applying a reverse voltage.

* * * * *